March 13, 1962  E. E. WIECZOREK  3,025,007
DISPOSAL UNIT

Filed May 19, 1960  2 Sheets-Sheet 1

INVENTOR.
EUGENE E. WIECZOREK
BY
Charles B. Cannon
Atty.

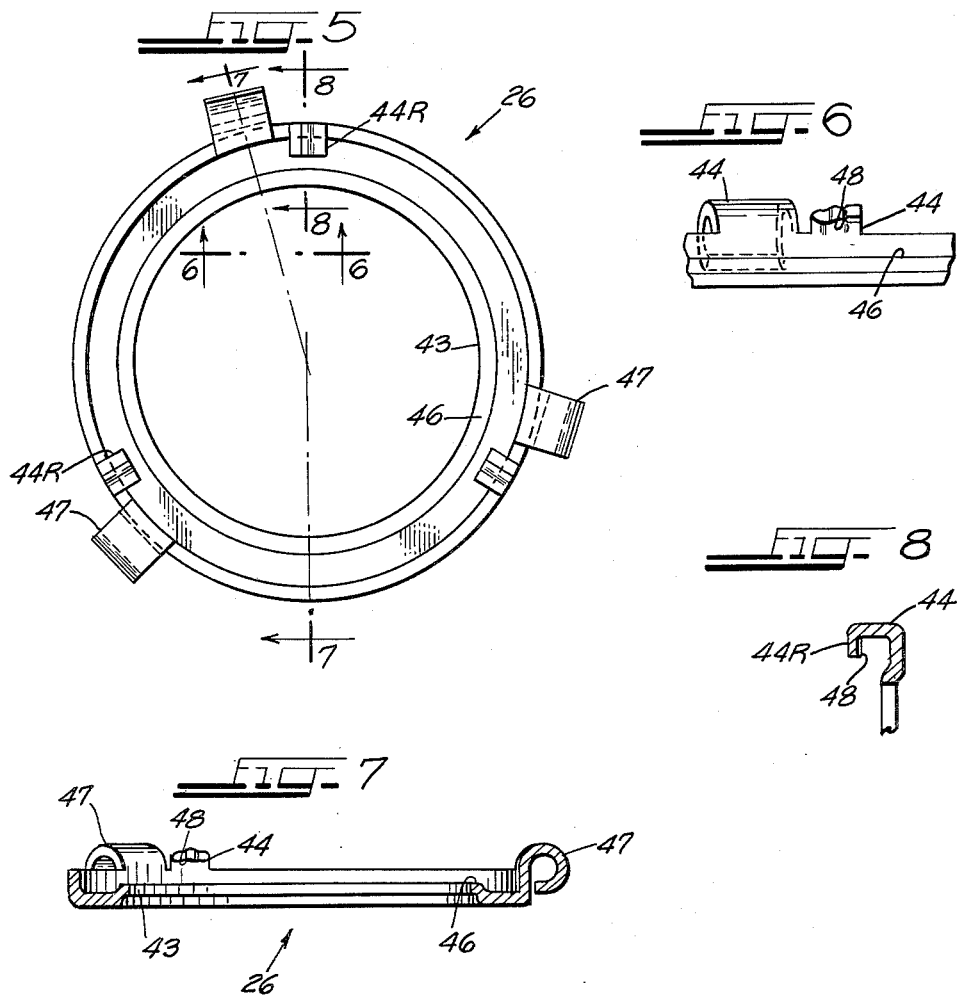

United States Patent Office 3,025,007
Patented Mar. 13, 1962

3,025,007
DISPOSAL UNIT
Eugene E. Wieczorek, Racine, Wis., assignor to In-Sink-Erator Manufacturing Company, Racine, Wis., a corporation of Wisconsin
Filed May 19, 1960, Ser. No. 30,229
5 Claims. (Cl. 241—100.5)

This invention relates to a sink mount for waste disposal units.

Waste disposal units are generally suspended from a flanged ring or collar fitted within the drain opening of the sink. The most commonly utilized method of attaching the main body of the waste disposal unit to such a flanged ring has been one wherein a first plate has been affixed to a lower end of the flanged ring and a second plate has been affixed to the upper end of the disposal unit. A series of bolts or threaded studs and nuts are utilized to connect the two plates and thus suspend the main body of the disposal unit from the flanged ring.

In such arrangements it will be recognized that it is necessary to include some sort of seal member between the upper end of the unit and the lower end of the ring to prevent fluid leakage therebetween. Such a seal member may also be effective to damp out vibration and attendant noise which otherwise would be transmitted from the disposal unit to the sink. However, disposal units, which are inherently rather heavy and cumbersome, utilizing such mounting arrangements as known in the prior art, have required considerable time for mounting and have been inconvenient to install by reason of the bolt and nut connection described hereinabove; in addition, problems have arisen in obtaining a proper installation. Thus, if the nuts are turned down too tightly, the seal member is compressed to a condition wherein vibration is readily transmitted therethrough. If the nuts are not turned far enough the seal member may be ineffective to prevent fluid leakage between the juncture of the ring and the main body of the disposal unit. Therefore, the proper installation of disposal units has been quite dependent upon the skill and experience of the person making the installation. The problems presented in the installation of the disposal units by methods heretofore known have been especially acute in large scale development projects such as new housing developments wherein a large number of units are installed at one time.

It is therefore a primary object of this invention to construct a sink mount support assembly for a waste disposal unit which successfully avoids the difficulties heretofore encountered in the installation of such disposal units.

It is a specific object of this invention to construct a sink mount support assembly which includes a first member, mountable on the flanged ring, formed with inclined bayonet-type flanges and a second member, mountable on the main body of the disposal unit, formed with hanger portions adapted to engage and be supported on the inclined surfaces of the bayonet-type flanges on the first member. To connect the main body of the disposal unit to the flanged ring in the sink drain opening the hanger portions are engaged with the inclined surfaces and the main body is rotated relative to the flanged ring. Such rotation is effective to move the body toward the ring by reason of the inclination of the bayonet-type flanges. Each of the first and second members is formed with a latching device, and these latching devices are adapted to be cooperatively engaged whenever the hanger portions of the second member are rotated with respect to the first member and along the inclined surfaces of the bayonet-type flanges by a predetermined distance. This predetermined distance is just sufficient to compress a sealing member, interposed between the main body of the disposal unit and the ring, by an amount which is adequate to prevent fluid leakage but which is insufficient to compress the sealing member to a condition wherein an undue portion of the vibration is transmitted through the sealing member. Thus, virtually no skill or prior experience is required to install a waste disposal unit provided with a support assembly constructed in accordance with this invention inasmuch as the main body of the unit need only be rotated to a latched position which is readily discernible in the process of installing the unit. In accordance with another feature of this invention stop means may be provided to prevent the body from being rotated beyond the latched position.

It is yet another object of this invention to include the aforesaid supporting assembly in a novel sink-mounting arrangement so that the main body of the disposal unit can be enclosed by a decorative housing of the kind which could not heretofore be conveniently utilized because of the necessity of providing access for tools to the connecting apparatus heretofore utilized in the prior art devices.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

FIG. 5 is a top plan view of a support member utilized in the arrangement illustrated in FIG. 1;

FIG. 6 is a fragmentary detailed view taken substantially in the direction of the arrows 6—6 in FIG. 5;

FIG. 7 is an enlarged view taken substantially along the line of the arrows 7—7 in FIG. 5; and FIG. 8 is a fragmentary detailed view taken approximately along the line of the arrows 8—8 in FIG. 5.

Figure 1:
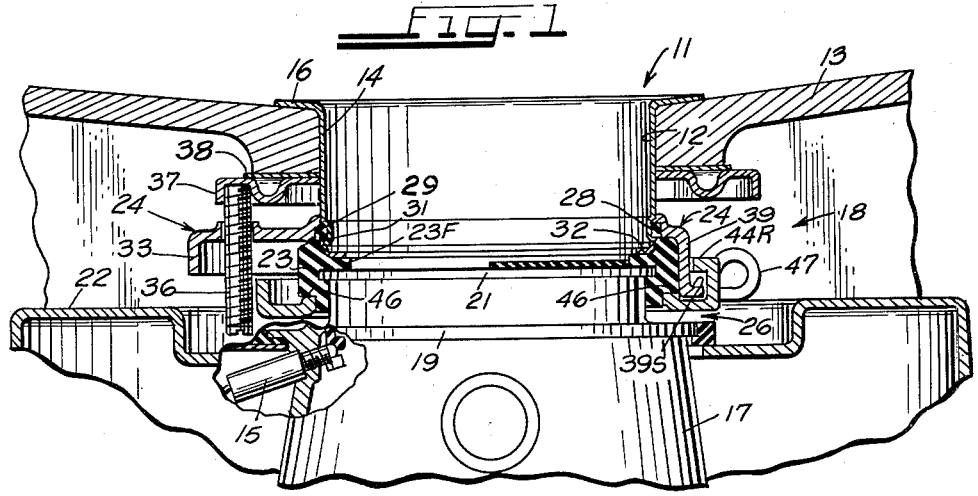
FIG. 1 is an elevation view, in section, illustrating an embodiment of a waste disposal supporting assembly constructed in accordance with this invention.

In FIG. 1 a waste disposal unit is indicated generally by the reference numeral 11 and is illustrated in its mounted position within a drain opening 12 of a sink 13. The disposal unit 11 includes an annular ring or collar member 14 having a radially outwardly projecting flange 16 which is adapted to reside on the upper peripheral surface of the sink 13 bordering the drain opening 12. The unit 11 may also include a switch 15 for energizing the motor of the unit.

The disposal unit 11 also includes a main body portion 17 which is suspended from the collar 14 by novel connecting apparatus, indicated generally by the reference character 18 and presently to be described in detail. The usual comminuting chamber and the drive motor are contained within the main body portion 17 of the waste disposal unit. It may be noted that the body portion 17 includes a pair of radially outwardly projecting lip-type flanges 19 and 21 at the upper end thereof, as viewed in FIG. 1. These two flanges are vertically spaced from one another and the larger flange 19 affords means for mounting a decorative casing 22 thereon. This decorative casing 22 encloses the greater portion of the waste disposal unit 11 which is suspended beneath the draining opening 12 to thereby enhance the overall appearance of the disposal unit. The smaller and uppermost flange 21 is provided to afford a mount for a resilient sealing member 23 which comprises a part of the connecting apparatus 18, as will become apparent from the further description.

The connector apparatus 18 also includes a pair of generally annular upper and lower connector members 24 and 26. The upper connector member 24, as viewed in FIG. 1, is shown separate from the waste disposal unit in FIGS. 2–4, and the lower connector member 26 is shown separate from the waste disposal unit in FIGS. 5–7.

Figure 4:
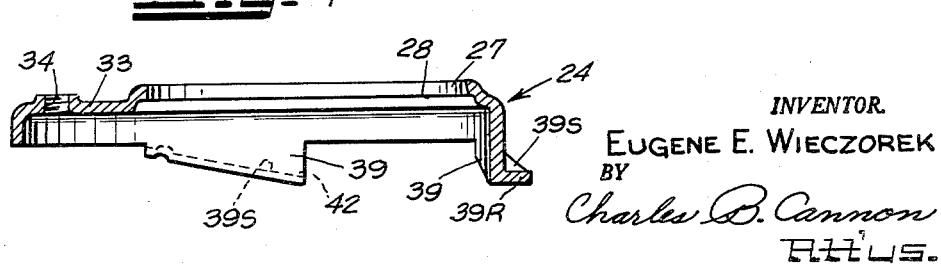
FIG. 4 is an elevation view taken substantially along the line of the arrows 4—4 in FIG. 2.

As best illustrated in FIG. 4, the connector member 24 is formed with a central opening 27 which is defined within a stepped flange construction affording an annular surface 28 within the connector member. Referring again to FIG. 1, it is seen that the connector member 24 is mounted on the collar 14 by a snap ring 29 seated within an annular groove 31 formed in the lower end portion of the collar member. Thus, as illustrated in FIG. 1, the snap ring 29 is effective to engage the annular surface 28 of the connector member 24. Immediately beneath the annular groove 31 the collar 14 is formed with an inwardly directed flange 32 which affords a surface for engaging a similar inwardly directed flange portion 23F of the seal member 23.

Figures 2, 3:
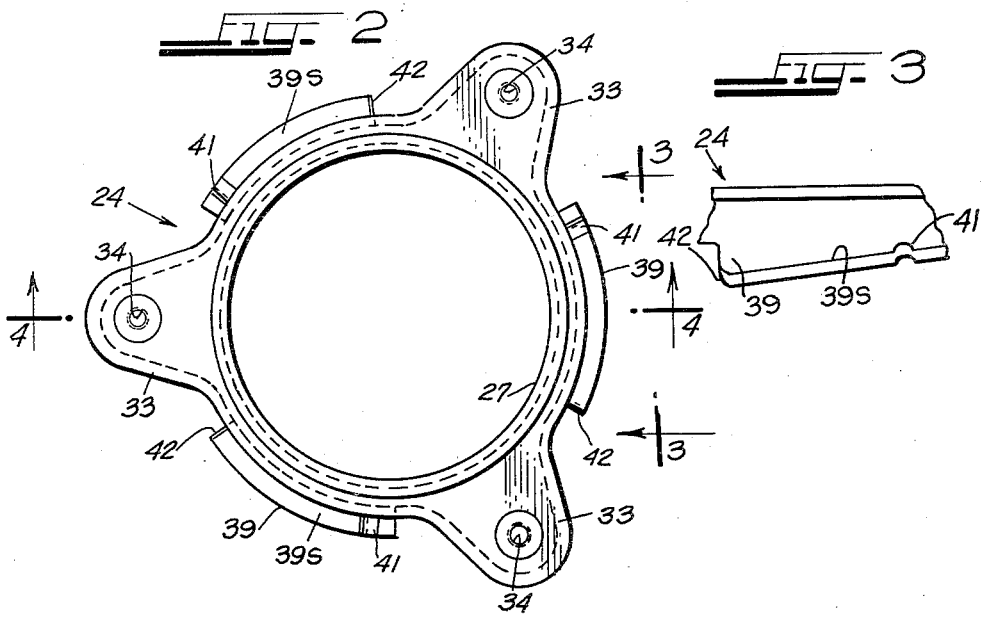
FIG. 2 is a top plan view of a mounting flange utilized in the arrangement illustrated in FIG. 1.
FIG. 3 is a fragmentary detailed view taken substantially in the direction of the arrows 3—3 in FIG. 2.

As shown in the plan view of the connector member 24 in FIG. 2, the connector member includes radially outwardly projecting lugs 33, each of which is formed with internally threaded openings 34. Each threaded opening 34 is adapted to receive an externally threaded stud, such as the stud 36 shown in FIG. 1. Each stud 36 is adapted to engage an under surface of a seal plate 37 in a manner such that rotation of the stud within a threaded opening 34 is effective to press a gasket 38 into fluid-tight sealing relation with that portion of the under surface of the sink 13 which borders the drain opening 12. Such adjustment of the studs 36 also serves to maintain the connector member 24 in seated relation on the snap ring 28.

With particular reference to FIGS. 3 and 4 it is seen that the connector member 24 is also formed with a plurality of depending flanges 39, in this case three in number. The flanges 39 are circumferentially spaced from one another and include radially outwardly directed portions 39R, each of which has an inclined upper surface 39S. Adjacent one end portion of each of the flange portions 39R a raised projection in the form of a radial rib 41 projects from the inclined surface 39S. Also, the opposite ends of the flange portions 39R are bent upwardly to form stops 42 which prevent the unit from dropping to the floor during installation. Also, the upturned stops 42 form a lock when the unit is installed so that the plumber can line up the unit properly with plumbing before securing the unit.

With particular reference now to FIGS. 5–8 of the drawings, it is seen that the generally annular connector member 26 is formed with a central opening 43 which is just slightly larger than the outside diameter of the flange 21 of the body portion of the waste disposal unit, see FIG. 1. The connector member 26 also includes upstanding hanger elements 44 spaced about the periphery thereof. Each hanger element 44 includes a radially inwardly directed portion 44R, the lower surface of which is adapted to engage an inclined upper surface 39S of the connector member 24. The lower connector member 26 also embodies a stepped flange construction which defines an annular surface 46 surrounding the upper periphery of the central opening 43 and which annular surface is adapted to engage a similar recessed surface of the seal 23 as illustrated in FIG. 1. Tab members 47 are formed integrally with the connector member 26 so as to be closely adjacent each of the hanger elements 44 and are bent to the generally cylindrical configuration best illustrated in FIG. 7 to define hook eyes adapted to receive an Allen head wrench or similar tool.

It should be noted that the under surface of each of the inwardly directed portions 44R of the hanger elements 44 is formed with a generally concave recess 48 which is shaped complementary to the raised ribs 41 of the connector member 24. As will become apparent from the continued description, the recesses 48 and the raised ribs 41 constitute latching means for retaining the two connector members in predetermined angular orientation.

In the mounting of the disposal unit 11 within the drain opening 12 of the sink, the collar 14 is dropped into position and the gasket 38, seal plate 37 and connector member 24 are slipped over the lower end thereof. The snap ring 29 is seated within the recess 31 and the studs 36 are turned within the lugs 33 to press the gasket 38 into tight, sealing relation with the under surface of the sink 13 as described hereinabove. The lower connector member 26 is passed over the flange 21 of the main body portion 17 and the resilient seal 23 is positioned on the flange 21 so as to be interposed between the connector member 26 and the body portion 17 in the manner illustrated in FIG. 1.

With the different component parts of the connector mechanism 18 thus partially assembled, the body portion 17 is thereafter suspended from the collar 14 without the necessity of having resort to bolt-and-nut or like fastening means, as has heretofore been the usual practice. Instead, it is necessary only that the body portion 17 and the lower connector member 26 be moved to a position wherein the lower surfaces of the flanges 44R engage and reside on the lowermost portions of the inclined surfaces 39S of the connector member 24. In this position the entire weight of the waste disposal unit is supported through the connector apparatus 18. Thereafter an Allen head wrench or like tool is inserted within the eyelets defined by the curved members 47 and the lower connector member 26, as well as the body portion 17, is rotated relative to the upper connector member 24 and collar 14. By reason of the inclination of the surfaces 39, such relative rotation between the two connector members causes the flange 21 to be moved toward the flange 32 (see FIG. 1) to compress the flange 23F of the seal member 23 therebetween. After a predetermined amount of such rotation of the connector member 26 with respect to the connector member 24, corresponding to a predetermined compression of the flange 23F between the flanges 21 and 32, the recesses 48 are moved over the projecting ribs 41 to retain the two connector members in latched relation. Preferably, the members 47 defining the wrench-receiving eyelets are so located on the lower connector member 26 as to abut the edges of the lugs 33 to positively prevent the connector member 24 from being inadvertently rotated beyond this latched position.

Thus, in accordance with this invention there is afforded connector apparatus which enables a waste disposal unit to be installed in an operative position in a quick and simple manner with a minimum of physical effort. Moreover, problems of improper installation resulting in leakage or excessive noise due to too tight or too loose a fit about the seal member are effectively avoided inasmuch as the connector apparatus of this invention incorporates latching means which determine the correct disposition of the component parts of the connector apparatus.

Hence, while I have illustrated and described the preferred embodiment of my invention, it is to be understood that this is capable of variation and modification.

I claim:

1. In a support assembly for a waste disposal unit including a body portion containing a comminuting chamber for said unit disposed beneath the drain opening of a sink, the combination of annular first connector means, means, including upper outwardly projecting flange means on said connector means, for maintaining said connector means in fixed position relative to said drain opening, said connector means including lower radially outwardly projecting flange means having elongated inclined upper surfaces, annular second connector means adapted to support said body portion from said first connector means, said second connector means including upwardly and radially inwardly projecting hanger means disposed in position to engage said upper surfaces, and radially inwardly projecting flange means disposed below said hanger means, and sealing means disposed radially inwardly of said first and second connector means between said first and second connector means and said body portion and between said inwardly projecting flange means and the upper portion of said first connector means, said hanger means being reciprocable along said upper surfaces to thereby move said second connector means upwardly toward and downwardly away from said first connector means to thereby compress and release the compression on, respectively, said sealing means between said first and second connector means and between said body portion and said first and second connector means.

2. In a support assembly for supporting the main body portion of a waste disposal unit from a drain collar positioned in a sink opening, the combination of: an annular first connector member including radially outwardly projecting flange means having elongated inclined upper surfaces; means, including other outwardly projecting flange means on said connector member, for maintaining said connector member in fixed position on such a drain collar; an annular second connector member including radially inwardly projecting flange means for engaging said surfaces, said second member including other inwardly projecting flange means disposed below said first mentioned inwardly projecting flange means; a resilient sealing ring mounted on said other inwardly projecting flange means and disposed radially inwardly of said first and second connector members, said first mentioned inwardly projecting flange means being movable along said surfaces in one direction effective to move said second connector member toward said first connector member to thereby press said sealing ring against said first connector member and radially inwardly against said body portion and said drain collar.

3. The combination in a support assembly as defined in claim 1 and in which said hanger means have recesses formed therein, and in which said inclined upper surfaces have projections formed in the upper end portions thereof adapted to seat in said recesses and thereby releasably hold said hanger means at a fixed position on said inclined upper surfaces.

4. The combination in a support assembly as defined in claim 1 and which includes means on said inclined surfaces in position to operatively engage and thereby releasably hold said hanger means in fixed positions at both ends of said inclined surfaces.

5. The combination in a support assembly as defined in claim 1, and which includes members projecting outwardly of said hanger means in position to be operatively engaged by a tool for rotating said second connector means and thereby move said hanger means along said upper surfaces.

References Cited in the file of this patent
UNITED STATES PATENTS

| | | |
|---|---|---|
| 2,170,010 | Conner | Aug. 22, 1939 |
| 2,819,028 | Brezosky et al. | Jan. 7, 1958 |
| 2,846,154 | Wieczorek | Aug. 5, 1958 |
| 2,875,958 | Wieczorek | Mar. 3, 1959 |
| 2,919,937 | Dovey | Jan. 5, 1960 |
| 2,925,225 | Jordan | Feb. 16, 1960 |